United States Patent
Koizumi et al.

(10) Patent No.: US 11,996,120 B2
(45) Date of Patent: May 28, 2024

(54) SOUND GENERATION APPARATUS, DATA GENERATION APPARATUS, ANOMALY SCORE CALCULATION APPARATUS, AND PROGRAM

(71) Applicant: NIPPON TELEGRAPH AND TELEPHONE CORPORATION, Tokyo (JP)

(72) Inventors: Yuma Koizumi, Tokyo (JP); Shin Murata, Tokyo (JP); Noboru Harada, Tokyo (JP); Shoichiro Saito, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 214 days.

(21) Appl. No.: 17/425,672

(22) PCT Filed: Jan. 16, 2020

(86) PCT No.: PCT/JP2020/001149
§ 371 (c)(1),
(2) Date: Jul. 23, 2021

(87) PCT Pub. No.: WO2020/158398
PCT Pub. Date: Aug. 6, 2020

(65) Prior Publication Data
US 2022/0122629 A1 Apr. 21, 2022

(30) Foreign Application Priority Data
Jan. 30, 2019 (JP) ................. 2019-014000

(51) Int. Cl.
*G10L 25/78* (2013.01)
*G10L 25/30* (2013.01)
*G10L 25/51* (2013.01)

(52) U.S. Cl.
CPC .............. *G10L 25/78* (2013.01); *G10L 25/30* (2013.01); *G10L 25/51* (2013.01)

(58) Field of Classification Search
CPC ......... G10L 25/78; G10L 25/30; G10L 25/51; G10L 25/27; G05B 23/02; G06N 20/00
See application file for complete search history.

(56) References Cited

U.S. PATENT DOCUMENTS 7,792,770 B1 * 9/2010 Phoha ................. G06N 20/00
706/45
11,374,952 B1 * 6/2022 Coskun ................. G06N 3/045
(Continued)

FOREIGN PATENT DOCUMENTS

| JP | 2000216943 A | 8/2000 |
| JP | 2010216943 A | 9/2010 |
| JP | 2012181280 A | 9/2012 |

OTHER PUBLICATIONS

Koizumi et al. "Anomaly Sound Detection for Machine Operating Sounds using Deep Neural Networks", pp. 473-476, Mar. 17, 2017, with English translation.
(Continued)

*Primary Examiner* — Fariba Sirjani (57) ABSTRACT

The accuracy of unsupervised anomalous sound detection is improved. An anomalous sound generation unit 12 generates a pseudo-anomalous sound by associating a sound obtained from a predetermined device with a probability distribution followed by a sound obtained from a desired device group. A threshold value setting unit 13 sets a threshold value so that all anomaly scores calculated from the pseudo-anomalous sound are determined to be anomalous. A parameter update unit 14 uses an obtained normal sound and an obtained anomalous sound, or a threshold value and a value based on the obtained anomalous sound, to update a parameter so to reliably determine an anomalous sound as anomalous and minimize the probability of determining a normal sound as anomalous.

3 Claims, 5 Drawing Sheets

(56) References Cited

U.S. PATENT DOCUMENTS

| | | | | |
|---|---|---|---|---|
| 2007/0239636 | A1* | 10/2007 | Tang | G06N 7/01 |
| | | | | 706/20 |
| 2014/0180980 | A1* | 6/2014 | Hido | G06Q 10/10 |
| | | | | 706/12 |
| 2015/0293523 | A1* | 10/2015 | Yamamoto | G06N 20/00 |
| | | | | 700/175 |
| 2018/0159808 | A1* | 6/2018 | Pal | H04L 51/212 |
| 2018/0350167 | A1* | 12/2018 | Ekkizogloy | B60R 11/0247 |
| 2019/0034836 | A1* | 1/2019 | Chari | G06N 20/20 |
| 2019/0166024 | A1* | 5/2019 | Ho | H04L 43/0823 |
| 2019/0219994 | A1* | 7/2019 | Yan | G05B 13/027 |
| 2019/0261109 | A1* | 8/2019 | Das | G05B 23/0216 |
| 2019/0295568 | A1* | 9/2019 | Sudo | G10L 25/51 |
| 2020/0106789 | A1* | 4/2020 | Boros | G06N 3/088 |
| 2020/0193309 | A1* | 6/2020 | Hazard | G06N 5/041 |
| 2020/0210849 | A1* | 7/2020 | Ben Kimon | G06N 3/084 |
| 2020/0272125 | A1* | 8/2020 | Okudera | G06F 17/18 |
| 2021/0194897 | A1* | 6/2021 | Putman | G06N 3/08 |
| 2021/0201079 | A1* | 7/2021 | Watanabe | G06F 17/15 |
| 2021/0270127 | A1* | 9/2021 | Zhu | G06N 3/047 |
| 2022/0122629 | A1* | 4/2022 | Koizumi | G05B 23/02 |

OTHER PUBLICATIONS

Ide et al. "Anomaly Detection and Change Detection", Kodansha, pp. 6-7, Aug. 7, 2015 with partial translation.

* cited by examiner

ANR: -20 dB

| Method (#-shot, category) | door | pageturn | all |
|---|---|---|---|
| AE (baseline) | 0.855 | 0.720 | 0.795 |
| COS-CE (1-shot, door) | 0.867 | 0.720 | 0.797 |
| MSE-CE (1-shot, door) | 0.962 | 0.952 | 0.881 |
| SNIPER (1-shot, door) | 0.972 | 0.917 | 0.902 |
| COS-CE (3-shot, door) | 0.882 | 0.675 | 0.759 |
| MSE-CE (3-shot, door) | 0.955 | 0.972 | 0.930 |
| SNIPER (3-shot, door) | 0.976 | 0.975 | 0.931 |
| COS-CE (1-shot, pageturn) | 0.855 | 0.720 | 0.794 |
| MSE-CE (1-shot, pageturn) | 0.892 | 0.675 | 0.780 |
| SNIPER (1-shot, pageturn) | 0.969 | 0.969 | 0.928 |
| COS-CE (3-shot, pageturn) | 0.851 | 0.775 | 0.813 |
| MSE-CE (3-shot, pageturn) | 0.945 | 0.948 | 0.880 |
| SNIPER (3-shot, pageturn) | 0.972 | 0.990 | 0.934 |

SOUND GENERATION APPARATUS, DATA GENERATION APPARATUS, ANOMALY SCORE CALCULATION APPARATUS, AND PROGRAM

CROSS-REFERENCE TO RELATED APPLICATIONS

This application is a U.S. 371 Application of International Patent Application No. PCT/JP2020/001149, filed on 16 Jan. 2020, which application claims priority to and the benefit of JP Application No. 2019-014000, filed on 30 Jan. 2019, the disclosures of which are hereby incorporated herein by reference in their entireties.

TECHNICAL FIELD

The present invention relates to an anomaly detection technology for determining whether a target to be monitored is in a normal state or in an anomalous state.

BACKGROUND ART

In a factory or the like, even a shutdown of an industrial device installed therein, such as a large-sized manufacturing or molding machine, due to a failure significantly hinders the factory's operation. It is thus necessary to routinely monitor the operational status of the device and immediately take measures in the event of an anomaly. One solution is to regularly dispatch a maintenance person to the field from an industrial device management service to check machine components for wear and the like. However, this requires enormous personnel and/or traveling costs and labor, and thus, it is difficult to implement this on all industrial devices and/or factories. A solution to this problem is to install a microphone inside such an industrial device so as to routinely monitor the operational sound of the device. In this solution, the operational sound collected by the microphone is analyzed, and if any occurrence of sound likely to be an anomaly (hereinafter referred to as "anomalous sound") is detected, an alert is raised, thereby solving the anomaly. In this way, techniques for determining whether a target to be monitored is in a normal state or in an anomalous state by utilizing sound are referred to as anomalous sound detection.

Setting the types of anomalous sound and/or methods for detecting them for every machine type or individual unit is even more expensive. It is therefore desirable that rules for detecting anomalous sounds can be automatically designed. To address this problem, anomalous sound detection based on statistical approaches is well known (see Non Patent Literature 1, for instance). Anomalous sound detection based on statistical approaches is generally classified into supervised anomalous sound detection and unsupervised anomalous sound detection. In the supervised anomalous sound detection, a large amount of training data of normal sounds and anomalous sounds is collected, and a classifier is trained to maximize the classification rate. On the other hand, in the unsupervised anomalous sound detection, the probability distribution (normal model) of training data features of normal sounds is learned, and if a newly collected sound is similar to the normal model (if the likelihood is high), the sound is determined to be normal, and if the newly collected sound is not similar to the normal model (if the likelihood is low), the sound is determined to be anomalous. In industrial applications, it is difficult to collect a large amount of training data of anomalous sounds, and thus, unsupervised anomalous sound detection is adopted in many cases.

CITATION LIST

Non Patent Literature

Non-Patent Literature 1: Tsuyoshi Ide, Masashi Sugiyama, "Anomaly Detection and Change Detection", Kodansha, pp. 6-7, 2015

SUMMARY OF THE INVENTION

Technical Problem

In operating an anomalous sound detection system, an anomalous sound may be rarely overlooked. No countermeasures taken for the overlooked anomalous sound may lead to a serious accident. It is thus necessary to update the anomalous sound detection system with collected anomalous sounds so that the same anomalous sound is not overlooked ever again. However, a data amount of the obtained anomalous sounds is much smaller than a data amount of normal sounds, and thus, it is still difficult to apply supervised anomalous sound detection.

In view of the above points, an object of the present invention is to improve the accuracy of unsupervised anomalous sound detection using a small number of obtained anomalous sound data.

Means for Solving the Problem

In order to solve the above problems, a sound generation apparatus according to a first aspect of the present invention is a sound generation apparatus for generating, from a sound obtained from a predetermined device, a generated sound being obtainable from any one device including the predetermined device and having a sound likelihood obtained from the predetermined device, and the sound generation apparatus includes a generation unit that generates the generated sound by associating the sound obtained from the predetermined device with a probability distribution followed by a sound obtained from a desired device group including the predetermined device.

In order to solve the above problems, a data generation apparatus according to a second aspect of the present invention is a data generation apparatus for generating, from data belonging to a predetermined cluster, generated data that belongs to any one cluster including the predetermined cluster and has a data likelihood belonging to the predetermined cluster, and the data generation apparatus includes a generation unit that generates the generated data by associating the data belonging to the predetermined cluster with a probability distribution followed by data belonging to a desired cluster group including the predetermined cluster.

In order to solve the above problems, an anomaly score calculation apparatus according to a third aspect of the present invention is an anomaly score calculation apparatus for calculating an anomaly score of a sound to be determined, and the anomaly score calculation apparatus includes a calculation unit that calculates an anomaly score by associating a sound to be determined with a similarity degree to a registered sound group including at least an anomalous sound and a dissimilarity degree to at least one normal sound.

In order to solve the above problems, an index value calculation apparatus according to a fourth aspect of the present invention is an index value calculation apparatus for calculating an index value of data to be determined, and the index value calculation apparatus includes a calculation unit that calculates data to be determined by using, as an index value, a sum of a similarity degree to a data group of a first cluster and a dissimilarity degree to a data group of a second cluster, the first cluster being a cluster for determining that the data to be determined belongs to the first cluster, and the second cluster being a cluster for determining that the data to be determined does not belong to the first cluster.

Effects of the Invention

According to the anomaly detection technology of the present invention, the accuracy of anomaly detection is improved.

DESCRIPTION OF EMBODIMENTS

The present invention provides a framework for improving the accuracy of unsupervised anomalous sound detection using a small number of obtained anomalous sound data. In the present invention, a similarity function (or penalty) is estimated from a small number of anomalous sound data, and an anomaly score is calculated using together with the estimated similarity function. The similarity function is defined as a similarity degree between a small number of anomalous sounds and an observed signal. That is, an observed signal similar to anomalous sounds obtained so far is given a penalty that makes it easy to determine that the observed signal is anomalous. Furthermore, an observed signal not similar to the anomalous sounds obtained so far, but also not similar to a normal sound, is given a penalty that makes it easy to determine that the observed signal is anomalous. In order to learn this anomaly score, there is provided an algorithm that optimizes a parameter of the anomaly score so to minimize the false positive rate being the probability of erroneously determining a normal observed signal as anomalous, under an anomaly determination threshold value at which all obtained anomalous data can be determined as anomalous.

Unsupervised Anomalous Sound Detection Anomalous sound detection is a task of determining whether a condition of a target to be monitored that generates an input x is normal or anomalous. Here, x in which the logarithmic amplitude spectra $\ln|X_{t,f}|$ of the observed signal are arranged, for example, as in Formula (1) can be employed for x described above.

$$x := (\ln|X_{t-Q,1}|, \ln|X_{t-Q,2}|, \ldots, \ln|X_{t+Q,F}|)^T \quad (1)$$

Here, $t=\{1, 2, \ldots, T\}$ is an index of the time, $f=\{1, 2, \ldots, F\}$ is an index of the frequency, and Q is the number of past and future frames to be considered in the input. x is not limited to this, and may be a result obtained by extracting a feature from the observed signal.

In anomalous sound detection based on a statistical approach, an anomaly acore $A(x)$ is calculated from the input x, as represented in Formula (2).

$$A(x) = -\ln \frac{p(x|z=0)}{p(x|z=1)} \quad (2)$$
$$= -\ln p(x|z=0) + \ln p(x|z=1)$$

Here, $p(x|z=0)$ is the probability distribution (a normal model) at which x is generated when the target to be monitored is in a normal state, and $p(x|z=1)$ is the probability distribution (an anomalous model) at which x is generated when the target to be monitored is in an anomalous state. Then, as represented in Formula (3), if the anomaly score $A(x)$ is greater than a predefined threshold value $\varphi$, the target to be monitored is determined to be anomalous and if the anomaly score $A(x)$ is smaller than the predefined threshold value $\varphi$, the target to be monitored is determined to be normal.

$$\text{IDENTIFICATION RESULT} = H(A(x) - \varphi) \quad (3)$$

Here, $H(\cdot)$ is a step function that returns 1 if the argument is non-negative and 0 if the argument is negative. If the identification result is 1, the observed signal is determined to be anomalous, and if the identification result is 0, the observed signal is determined to be normal.

In order to calculate Formula (3), the normal model and the anomalous model need to be known. However, the models are unknown, and thus need to be estimated from training data. The normal model can be designed, for example, by learning the following Gaussian Mixture Model (GMM) from operating sound data in a normal state (normal data) collected in advance.

$$p(x|z=0) := \sum_{k=1}^{K} w_k N(x|\mu_k, \Sigma_k) \quad (4)$$

Here, K is the number of mixtures, $N(x|\mu, \Sigma)$ is a Gaussian distribution with the mean vector $\mu$ and the variance-covariance matrix $\Sigma$ as parameters, $w_k$ is the weight of the k-th distribution, $\mu_k$ is the mean vector of the k-th distribution, and $\Sigma_k$ is the variance-covariance matrix of the k-th distribution.

While it is easy to collect a large amount of normal data, it is difficult to collect operating sound data in an anomalous state (anomalous data). In "unsupervised anomalous sound detection", generally, the anomalous model is omitted and the anomaly score $A(x)$ is defined as represented in Formula (5).

$$A(x) = -\ln p(x|z=0) \quad (5)$$

That is, in the unsupervised anomalous sound detection, it is determined that the observed signal is normal if the normal model and the observed signal are similar, and it is determined that the observed signal is anomalous if the normal model and the observed signal are not similar.

Principles of the Present Invention

When an unsupervised anomalous sound detection system is operated in an actual environment, anomalous data is infrequently collected. For example, anomalous data can be automatically obtained if the unsupervised anomalous sound detection system detects an anomalous state. Furthermore, even when the unsupervised anomalous sound detection system overlooks an anomalous state, if the anomalous state is discovered in a subsequent manual inspection or the like, the observation data until that point can be used as anomalous data. In a case such as the latter in particular, if the overlooked anomalous state remains unnoticed, a serious accident may be led, and thus, the system needs to be updated with the observed anomalous data. The present invention is a technology for improving the accuracy of anomalous sound detection by learning parameters of an anomaly score using anomalous data obtained during operation as described above.

Design of Anomaly Score

The similarity function representing the similarity degree score between the k-th registered sound $m_k \in R^Q$ and the observation data $x \in R^Q$ is defined as $S(x, m_k, \theta_S^k)$. Here, $\theta_S^k$ is a parameter of the similarity function. If the negative log-likelihood of the distribution based on the normal data obtained by performing training only from the normal data is $-\ln p(x|z=0, OA)$ and K−1 anomalous sounds $\{m_k\}_{k=1}^{K-1}$ are registered, an anomaly score $B(x, \theta_{K-1})$ can be calculated in Formula (6).

$$B(x, \theta_{K-1}) = -\ln p(x|z=0, \theta_A) + \gamma \sum_{k=1}^{K-1} S(x, m_k, \theta_S^k) \quad (6)$$

Here, $\theta_{K-1} = \{\theta_A, \theta_S^1, \ldots, \theta_S^{K-1}\}$, and $\gamma$ is a weight of the similarity function. For example, $\gamma=1$.

At this time, if a new K-th anomalous sound $m_K$ is obtained, the anomaly score $B(x, \theta_K)$ at any K can be calculated in Formula (7).

$$B(x, \theta_K) = B(x, \theta_{K-1}) + \gamma S(x, m_K, \theta_S^K) \quad (7)$$

If the anomaly score is defined in this way, sequential additional training is possible. That is, the K-th anomalous sample can be registered without modifying the anomaly score obtained from the anomalous samples until the K−1th anomalous sample.

That is, in the present invention, the unsupervised anomalous sound detection system is updated/corrected by defining the anomaly score as a function for calculating the weighted sum of the similarity degree between the obtained anomalous data and the observed signal, and using the anomaly score as a penalty term for inducing determination of an anomalous state if the obtained anomalous data and the observed signal are similar.

Design of Objective Function

In Formula (6), which represents the anomaly score of the present invention, the parameter to be determined is $\theta_S^k$. In order to determine a parameter by using training data, it is necessary to appropriately design an "objective function" that mathematically describes "what kind of parameter is a good parameter for the system". The objective function of anomalous sound detection can be designed by utilizing the area under the receiver operating characteristic curve (AUC), being a lower part area of a curve when the horizontal axis is set to the false positive rate (FPR) being the probability of erroneously determining a normal observed signal as anomalous, and the vertical axis is set to the true positive rate (TPR) being the probability at which it is possible to correctly determine an anomalous observed signal as anomalous. It is noted that, if the anomaly score is defined as in Formula (6), the true positive rate (TPR) and the false positive rate (FPR) can be defined as in Formulae (8) and (9).

$$TPR(\theta_K, \phi) = \int H(B(x, \theta_K) - \phi) p(x|z \neq 0) dx \quad (8)$$

$$FPR(\theta_K, \phi) = \int H(B(x, \theta_K) - \phi) p(x|z=0) dx \quad (9)$$

Here, $p(x|z \neq 0)$ is a probability distribution followed by a sound that is not a normal sound.

In early studies, training was performed to maximize the overall AUC (see Reference 1 below). On the other hand, in recent studies, it has been found that the performance of anomalous sound detection is improved by regarding unsupervised anomalous sound detection as a hypothesis testing, and training an unsupervised anomalous sound detection system to maximize the true positive rate under conditions for a certain risk rate (for example, the false positive rate) (see Reference 2 below). Such a concept is referred to as "Neyman-Pearson criterion".

Reference 1: A. P. Bradley, "The Use of the Area Under the ROC Curve in the Evaluation of Machine Learning Algorithms," Pattern Recognition, pp. 1145-1159, 1996.

Reference 2: Y. Koizumi, et al., "Optimizing Acoustic Feature Extractor for Anomalous Sound Detection Based on Neyman-Pearson Lemma," EUSIPCO, 2017.

In an anomalous sound detection system, if an overlooked anomalous state remains unnoticed, a serious accident may be led. It is difficult to obtain all anomalous data that a target to be monitored device may produce, and thus, it may be difficult to detect all the anomalous states which the target device to be monitored may take. However, it is possible to construct a system so that at least an anomalous state similar to the obtained anomalous data is always determined to be anomalous. The true positive rate for the newly obtained K-th anomalous sound is defined as K-TPR, and is defined as follows.

$$K\text{-}TPR(\theta_K, \phi) = \int H(B(x, \theta_K)) - \phi) p(x|z=K) dx \quad (10)$$

Formula (11) for minimizing the false positive rate (FPR) is defined as the objective function of the present invention under the condition that the true positive rate for the K-th obtained anomalous sound (K-TPR) is 1.0. The objective function of Formula (11) is hereinafter referred to as "conditional AUC maximization".

$$C(\theta_S^K) = \underset{\theta_S^K}{\mathrm{argmin}} FPR(\theta_K, \phi), \text{ subject to } K - TPR(\theta_K, \phi) = 1 \quad (11)$$

Figure 1A:
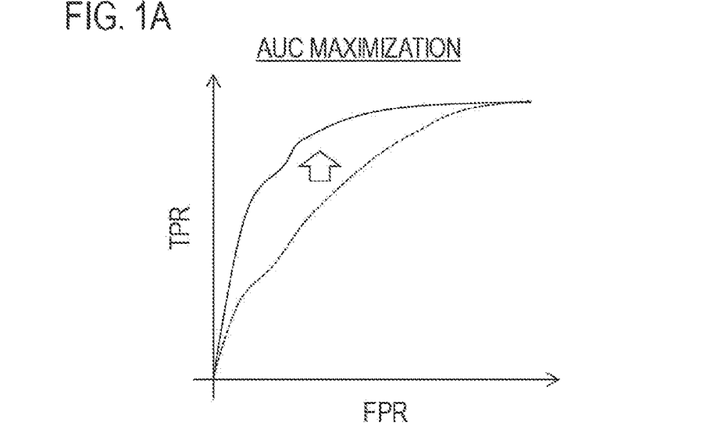
FIG. 1A is a graph for describing a concept of AUC maximization.
Figure 1B:
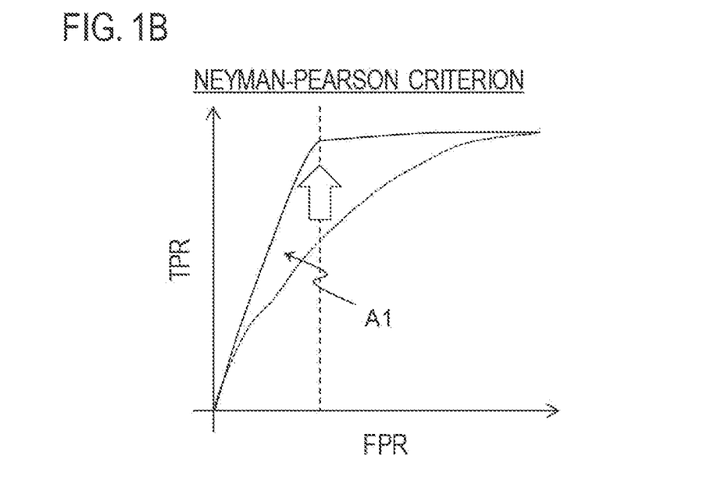
FIG. 1B is a graph for describing a concept of the Neyman-Pearson criterion.
Figure 1C:
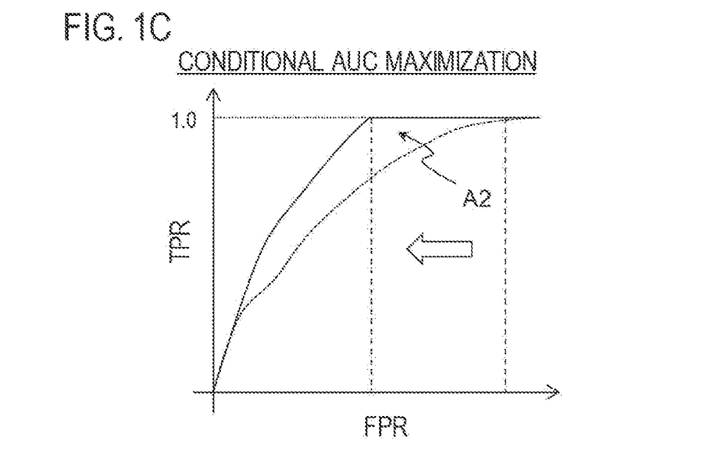
FIG. 1C is a graph for describing a concept of conditional AUC maximization.

FIG. 1 is graphs showing a difference in concept between the conventional "AUC maximization" (FIG. 1A) and the "Neyman-Pearson criterion" (FIG. 1B), and the "conditional AUC maximization" of the present invention (FIG. 1C). The dotted lines in the graphs are receiver operating characteristic (ROC) curves before training, and the solid lines are the ROC curves after training. Furthermore, the AUC is the area of the region sandwiched between the ROC curve and the x-axis, and in the AUC maximization, training is performed so to increase this area. The Neyman-Pearson criterion improves the TPR in a region where the false positive rate (FPR) has a specific value, and thus, the AUC is maximized (a region A1 on the left of the dashed line). On the other hand, the conditional AUC maximization is equivalent to directly maximizing the AUC in a region where the true positive rate (TPR) is 1.0 (a region A2 on the right of the dashed line). That is, the constraint term changes not with the false positive rate (FPR), but with the true positive rate (TPR). That is, in the conditional AUC maximization, the objective function is designed to minimize the probability of erroneously determining normal data as anomalous under the condition that anomalous data can be reliably determined as anomalous.

Learning Method

An algorithm that realizes the objective function on a computing machine is considered. The constraint term in Formula (11) can be satisfied by setting an appropriate threshold value. Here, if $\varphi_\rho$ satisfies the following formula $$K\text{-TPR}(\theta_K, \phi_\rho) = 1 \quad (12)$$

Formula (11) can be written as represented in Formula (13).

$$C(\theta_S^K) = \underset{\theta_S^K}{\arg\min} FPR(\theta_K, \phi_\rho) \quad (13)$$

If the threshold value ($\varphi_\rho$ is determined as described above, the optimization is therefore easy.

The above-described integration cannot be executed analytically, and thus, it is difficult to determine the true positive rate (K-TPR) in Formula (10). In the present invention, the integration described above is thus executed approximately by a sampling method. First, a variational autoencoder described below is used to pseudo-generate I anomalous samples $Y := \{y_i\}_{i=1}^I$. The condition for satisfying Formula (12) by using these samples is that $\varphi_\rho$ is smaller than all the anomaly scores determined from the generated samples. Thus, $\psi_\rho$ is determined as described below.

$$\phi_\rho \leftarrow \min_i B(y_i, \theta_K) - \beta \quad (14)$$

Here, $\beta$ is a positive constant.

Finally, it is desired to maximize Formula (11), but the integral in the false positive rate (FPR) in Formula (9) can also not be calculated analytically. Here, optimization is performed by a stochastic gradient method in which J pieces of data are randomly selected from the pieces of normal data and the gradient is calculated by approximating the integral to the sum of the values calculated from these data.

$$C(\theta_S^K) = \underset{\theta_S^K}{\arg\min} \sum_{j=1}^J H(B(x_j, \theta_K) - \phi_\rho) \quad (15)$$

$$\theta_S^K \leftarrow \theta_S^K = \alpha \frac{\partial C(\theta_S^K)}{\partial \theta_S^K} \quad (16)$$

Here, $\alpha$ is a step size. The gradient of $H(\cdot)$ being a step function cannot be determined, and thus, the gradient is approximated by a sigmoid function. The objective function may be changed as in Formula (17).

$$C(\theta_S^K) = \underset{\theta_S^K}{\arg\min} \sum_{j=1}^J H(B(x_j, \theta_K) - \phi_\rho) - \sum_{i=1}^I H(B(y_i, \theta_K) - \phi_\rho) \quad (17)$$

That is, in the present invention, an anomaly score is learned in such a way that the objective function minimizes the probability of erroneously determining normal data as anomalous under the constraint condition that the obtained anomalous data or anomalous data pseudo-generated from the obtained anomalous data by using the variational autoencoder can be reliably determined as anomalous.

Implementation Example

An example of implementing the above-described principle of anomalous sound detection according to the present invention will be described. The similarity function in the present invention is defined as in Formulae (18), (19), and (20).

$$S(x, m_k, \theta_S^k) = \frac{1}{2}\left[D(f_x^k, f_{m_k}^k) - \frac{1}{I}\sum_{i=1}^I D(f_x^k, f_{n_i}^k) + 1\right], \quad (18)$$

$$D(x, y) = 2 \cdot \text{sigmoid}(-(x-y)^T(x-y)), \quad (19)$$

$$f_x^k = W_k(x \circ \text{sigmoid}(g_k)) \quad (20)$$

Here, $\circ$ represents the multiplication for each element. That is, the parameters of the similarity function S are $\theta_S^k := \{W_k, g_k\}$. $W_k \in \mathbb{R}^{D \times Q}$ is a dimensionality reduction matrix, and $g_k \in \mathbb{R}^Q$ is a mask vector for setting unnecessary elements of x and $m_k$ (elements that are easily affected by noise) to 0 in advance. $g_k$ may not be provided, but the operation is stable if $g_k$ is provided.

$\{n_i\}_{i=1}^I$ represents I pieces of appropriately selected normal sound data. $1 \leq D(x, y) \leq 2$ is a function that returns a value close to 2 if x and y are similar, and a value close to 1 if x and y are not similar.

If the similarity function $S(x, m_k, \theta_S^k)$ is conceptually grasped, the similarity function has the following meaning, excluding the constants.

$S(x, m_k, \theta_s^k)$ = (similarity with registered anomalous sound $m$)–(similarity with registered normal sound $n$)

= (similarity with registered anomalous sound $m$)+ (dissimilarity with registered normal sound $n$) (21)

If the similarity function is configured only from the viewpoint of whether x and $m_k$ are similar, it is not possible to detect an anomalous sound that is an anomalous sound, but is not similar to the registered anomalous sound. On the other hand, in the similarity function of Formula (18), even if an anomalous sound is not similar to the registered anomalous sound, the similarity degree score increases when the anomalous sound is not similar to the registered normal sound, and thus, the detection accuracy is improved even for an unknown anomalous sound that is not registered.

Figure 2:
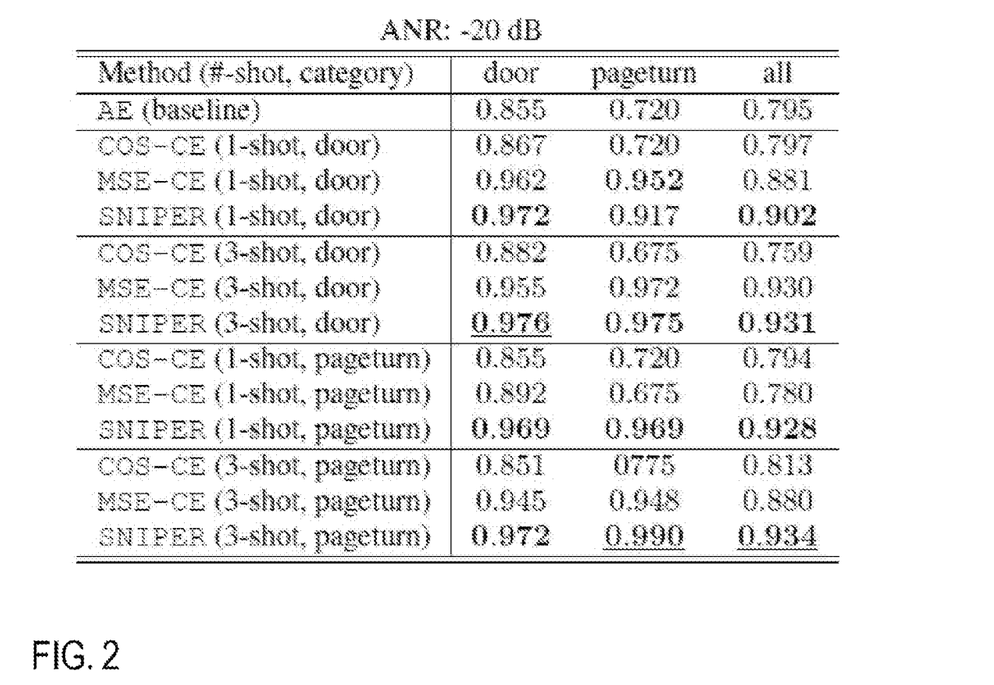
FIG. 2 is a table of experimental results showing an effect of the present invention.

FIG. 2 shows experimental results indicating that the detection accuracy is improved by the present invention. "AE" in the table of FIG. 2 is a method of using the negative log-likelihood of the distribution based on the normal data obtained by performing training from normal data as the anomaly score, and "SNIPER" is a method using the above-mentioned similarity function, and corresponds to the present invention. Higher values indicate higher detection accuracy. According to FIG. 2, it can be seen that in the method of the present invention, the detection accuracy is improved not only for a registered class of a sound (door or page turn), but also for all anomalous sounds (all).

When the similarity function of Formula (18) is used, each parameter can be updated as follows. First, an anomalous sample is generated in order to determine the threshold value $\varphi_\rho$. Here, the anomalous sample is generated using a variational autoencoder (see Reference 3 below).

Reference 3: D. P. Kingma, and M. Welling, "Auto-Encoding Variational Bayes", in Proc. of International Conference on Learning Representations (ICLR), 2013.

Anomalous sounds are part of every sound. If there is a function that can sample every sound, anomalous sounds can thus also be sampled. A variational autoencoder has a function of generating data similar to the input (that is, data preserving the characteristics of the input) but different from the input. Using this feature, the variational autoencoder is trained to sample every sound, and when a registered sound is obtained, the variational autoencoder is used to sample a sound similar to the registered sound.

The encoder of the variational autoencoder (a neural network that outputs the average and variance of a hidden variable) is defined as $\varepsilon^V$, and the decoder of the variational autoencoder is defined as $D^V$. Using this variational autoencoder, an n-th anomalous sample $x_n^{(K)}$ is sampled as follows.

$$x_n^{(K)} = D^V(z_n^{(K)}, \theta_D^V) \quad (23)$$

$$z_n^{(K)} \sim \text{Gaussian}(\mu_K, \nu_K), \quad (24)$$

$$\mu_K, \nu_K = \varepsilon^V(m_K, \theta_E^V) \quad (25)$$

Here, ~ represents sampling from the probability distribution on the right side, Gaussian represents a normal distribution, $\theta_E^V$ represents a parameter of the encoder, and $\theta_D^V$ represents a parameter of the decoder.

Embodiment

Hereinafter, embodiments of the present disclosure will be described in detail. In the drawings, the same reference numerals are given to constituent units that have the same functions and the repeated description will be omitted.

An embodiment of the present invention includes an anomaly score learning apparatus 1 that learns a parameter of the anomaly score described above, and an anomalous sound detection apparatus 2 that uses the parameter learned by the anomaly score learning apparatus 1 to determine whether an observed signal is normal or anomalous.

Anomaly Score Learning Apparatus

Figure 3:
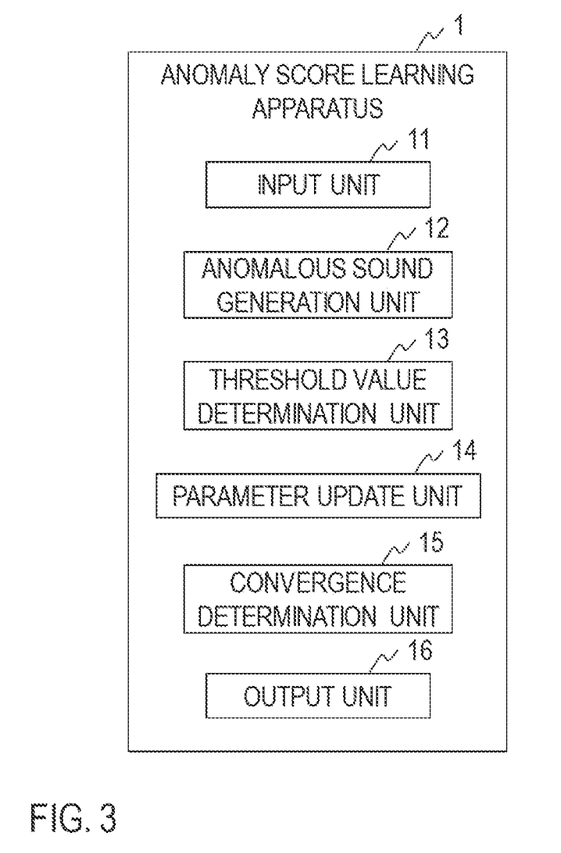
FIG. 3 is a diagram illustrating a functional configuration of an anomaly score learning apparatus.

As illustrated in FIG. 3, the anomaly score learning apparatus 1 according to the embodiment includes an input unit 11, an anomalous sound generation unit 12, a threshold value determination unit 13, a parameter update unit 14, a convergence determination unit 15, and an output unit 16. When the anomaly score learning apparatus 1 executes a process of each step exemplified in FIG. 4, an anomaly score learning method according to the embodiment is realized.

The anomaly score learning apparatus 1 is a special apparatus configured by, for example, a known or dedicated computer including a central processing unit (CPU) and a main storage device (random access memory, RAM) into which a special program is read. For example, the anomaly score learning apparatus 1 executes each process under the control of the central processing unit. Data input to the anomaly score learning apparatus 1 and data obtained in each process are stored in the main storage device, for example, and the data stored in the main storage device is read as needed to the central processing unit to be utilized for another process. At least a part of each processing unit of the anomaly score learning apparatus 1 may be configured by hardware such as an integrated circuit.

Figure 4:
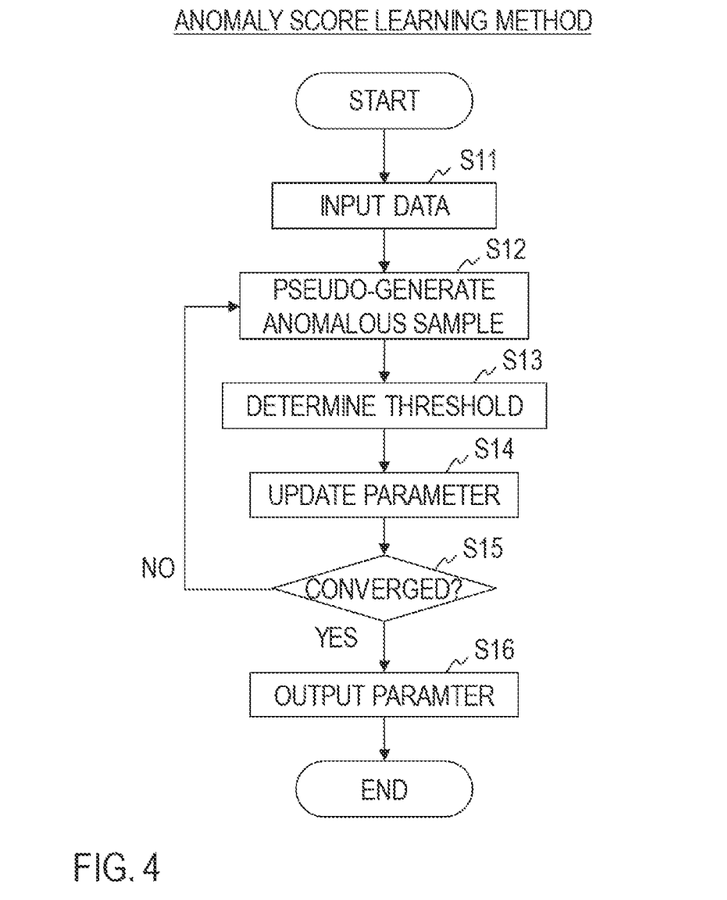
FIG. 4 is a diagram illustrating a processing procedure of an anomaly score learning method.

An anomaly score learning method executed by the anomaly score learning apparatus 1 according to the embodiment will be described with reference to FIG. 4.

In step S11, the input unit 11 receives a normal model $p(x|z=0)$, normal sound data, and anomalous sound data as input. The normal model $p(x|z=0)$ is a probability distribution estimated using normal sound data and is similar to a model used in conventional unsupervised anomalous sound detection. The normal sound data is a large amount of sound data in which sounds emitted by a device in a normal state are recorded. The anomalous sound data is a small amount of sound data in which sounds emitted by a device in an anomalous state are recorded. It is noted that the input normal sound data is preferably the same as the normal sound data used for learning the normal model $p(x|z=0)$, but is not necessarily the same.

In step S12, the anomalous sound generation unit 12 uses the variational autoencoder to pseudo-generate, from the input anomalous sound data, N anomalous samples $\{y_n\}_{n=1}^N$ according to Formulae (23) to (25). The anomalous sound generation unit 12 outputs the pseudo-generated anomalous sample $\{y_n\}_{n=1}^N$ to the threshold value determination unit 13.

In step S13, the threshold value determination unit 13 receives the anomalous sample $\{y_n\}_{n=1}^N$ from the anomalous sound generation unit 12, and sets the threshold value $\varphi_\rho$ on the basis of Formula (14). The threshold value determination unit 13 outputs the determined threshold value $\varphi_\rho$ to the parameter update unit 14.

In step S14, the parameter update unit 14 receives the threshold value $\varphi_\rho$ from the threshold value determination unit 13 and updates the parameter $\theta_K$ on the basis of Formula (11).

In step S15, the convergence determination unit 15 determines whether or not a preset end condition is satisfied. In accordance with a determination that the end condition is satisfied, the convergence determination unit 15 causes the process to proceed to step S16, and in accordance with a determination that the end condition is not satisfied, the convergence determination unit 15 returns the process to step S12. For example, the end condition may be set so that 500 repetitions of steps S12 to S14 are executed.

In step S16, the output unit 16 outputs the learned parameter $\theta_K$.

Anomalous Sound Detection Apparatus

Figure 5:
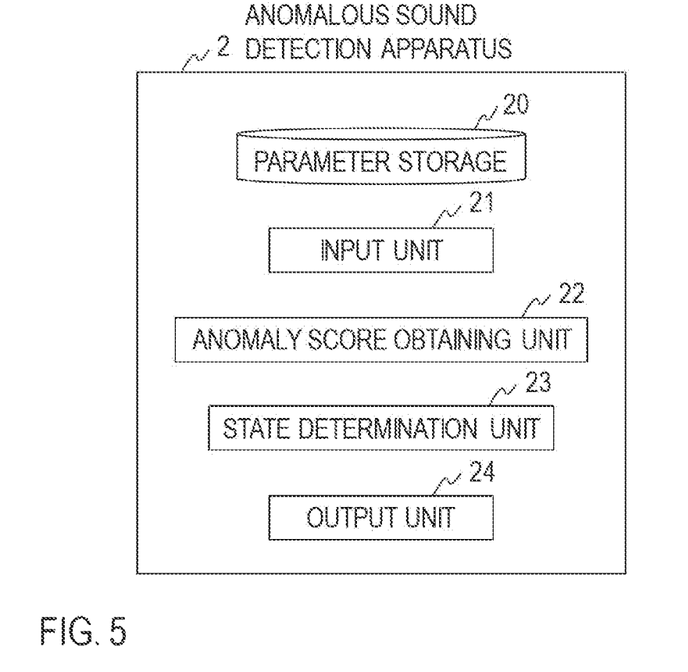
FIG. 5 is a diagram illustrating a functional configuration of an anomalous sound detection apparatus.

As illustrated in FIG. 5, the anomalous sound detection apparatus 2 according to the embodiment includes a parameter storage 20, an input unit 21, an anomaly score obtaining unit 22, a state determination unit 23, and an output unit 24. When the anomalous sound detection apparatus 2 executes a process of each step exemplified in FIG. 6, an anomalous sound detection method according to the embodiment is realized.

The anomalous sound detection apparatus 2 is a special apparatus configured by, for example, a known or dedicated computer including a central processing unit (CPU) and a main storage device (random access memory, RAM) into which a special program is read. For example, the anomalous sound detection apparatus 2 executes each process under the control of the central processing unit. Data input to the anomalous sound detection apparatus 2 and data obtained in each process are stored in the main storage device, for example, and the data stored in the main storage device is read as needed to the central processing unit to be utilized for another process. At least a part of each processing unit of the anomalous sound detection apparatus 2 may be configured by hardware such as an integrated circuit. Each storage included in the anomalous sound detection apparatus 2 can be configured by, for example, a main storage device such as a random access memory (RAM), an auxiliary storage device formed by a semiconductor memory element such as a hard disk, an optical disc, and a flash memory, or a middleware such as a relational database or a key-value store.

The parameter storage 20 stores the normal model $p(x|z=0)$, the learned parameter $\theta_k$, and the threshold value $\varphi$. Similarly as in the anomaly score learning apparatus 1, the normal model $p(x|z=0)$ is a model in which normal sound data is used to estimate the probability distribution, and the normal model $p(x|z=0)$ is similar to the model used in the conventional unsupervised anomalous sound detection. The threshold value $\varphi$ may be the threshold value $\varphi_\rho$ determined by the threshold value determination unit 13 of the anomaly score learning apparatus 1, or may be a threshold value manually given in advance.

Figure 6:
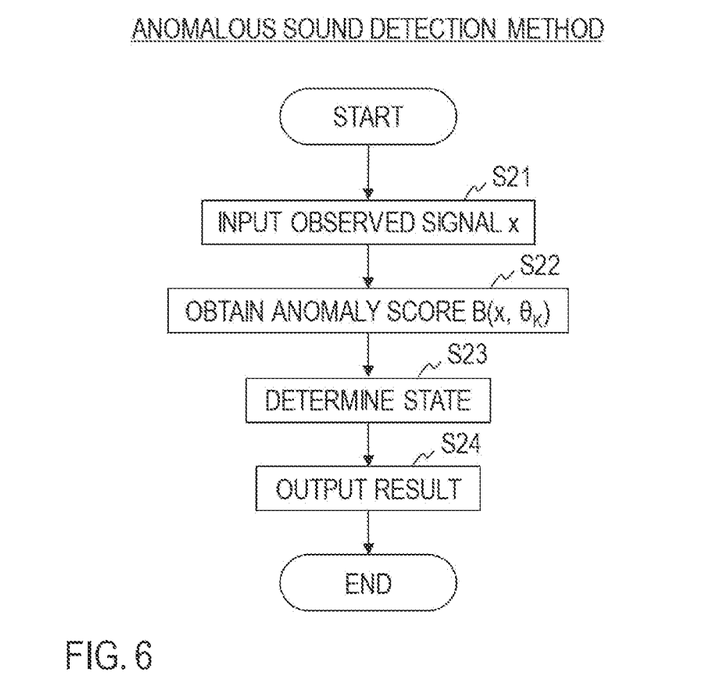
FIG. 6 is a diagram illustrating a processing procedure of an anomalous sound detection method.

The anomalous sound detection method executed by the anomalous sound detection apparatus 2 of the embodiment will be described below with reference to FIG. 6.

In step S21, the input unit 21 receives as input an observed signal x to be subjected to anomalous sound detection. The input unit 21 outputs the observed signal x to the anomaly score obtaining unit 22.

In step S22, the anomaly score obtaining unit 22 receives the observed signal x from the input unit 21, performs calculation using Formula (6), and obtains an anomaly score $B(x, \theta_K)$. The anomaly score obtaining unit 22 outputs the obtained anomaly score $B(x, \theta_K)$ to the state determination unit 23.

In step S23, the state determination unit 23 receives the anomaly score $B(x, \theta_K)$ from the anomaly score obtaining unit 22, performs calculation using Formula (3), and determines whether the observed signal x is normal or anomalous. The state determination unit 23 outputs a determination result, which is binary data indicating whether the observed signal x is normal or anomalous, to the output unit 24.

In step S24, the output unit 24 receives the determination result from the state determination unit 23, and uses the determination result as the output of the anomalous sound detection apparatus 2.

Modification Example

In the above-described embodiment, the anomaly score learning apparatus 1 has a configuration in which anomalous samples are pseudo-generated to learn parameters of the anomaly score, however, an anomalous sound generation apparatus may be configured to have only a function of pseudo-generating an anomalous sample. This anomalous sound generation apparatus includes the anomalous sound generation unit 12 included in the anomaly score learning apparatus 1 of the embodiment. This anomalous sound generation apparatus receives a small amount of anomalous data as input, for example, the anomalous sound generation unit 12 uses the anomalous data to pseudo-generate an anomalous sample, and the anomalous sample is output by the anomalous sound generation apparatus.

In the embodiment described above, a configuration is employed in which the anomalous sound detection apparatus 2 calculates an anomaly score from the observed signal and uses the anomaly score to determine whether the observed signal is normal or anomalous. However, an anomaly score calculation apparatus may be configured to have only a function of calculating an anomaly score from the observed signal. This anomaly score calculation apparatus includes the parameter storage 20 and the anomaly score obtaining unit 22 provided in the anomalous sound detection apparatus 2 according to the embodiment. For example, this anomaly score calculation apparatus, receives an observed signal as input, and the anomaly score obtaining unit 22 uses a learned parameter stored in the parameter storage 20 to calculate an anomaly score of the observed signal, and the anomaly score is the output by the anomaly score calculation apparatus.

In the embodiment described above, a configuration in which a function of pseudo-generating an anomalous sample is used for learning a parameter of an anomaly score is described, but the application of the function is not limited to this configuration, and the function may be applied to any technology that requires a large number of samples having a specific characteristic. Furthermore, in the embodiment described above, a configuration in which a function of calculating an anomaly score from an observed signal is used to determine whether a target device is in a normal or an anomalous state is described, but the application of the function is not limited to this configuration, and the function may be applied to any technology for determining a state from an obtained sample.

In the embodiment described above, an example in which the anomaly score learning apparatus 1 and the anomalous sound detection apparatus 2 are configured as separate apparatuses is described, but a configuration may be employed in which one anomalous sound detection apparatus has both a function of learning a parameter of an anomaly score and a function of detecting an anomalous sound by using the learned parameter. That is, the anomalous sound detection apparatus according to the modification example includes the input unit 11, the anomalous sound generation unit 12, the threshold value determination unit 13, the parameter update unit 14, the convergence determination unit 15, the parameter storage 20, the input unit 21, the anomaly score obtaining unit 22, the state determination unit 23, and the output unit 24.

In the embodiment described above anomalous sound detection with sound data as a target is described, but the present invention can also be applied to data other than sound data. For example, the present invention can also be applied to time-series data and image data other than sound data. For these applications, it is only required to choose a suitable x for an application target. If the application target is vibration sensor data or stock price data, a collection of time-series information of this data or a Fourier transform of the data may be employed, and if the application target is an image, an image feature amount or a result obtained by analyzing the image with a neural network or the like may be employed. In this case, the anomalous sound detection apparatus 2 functions as an anomaly detection apparatus that uses a normal model obtained by learning normal data being data during a normal state, and an anomaly score obtained by learning anomalous data being data during an anomalous state, to determine whether observation data is normal or anomalous.

The embodiment of the present invention is described above. A specific configuration is not limited to the embodiment and appropriate changes in the design are, of course, included in the present invention within the scope of the present invention without departing from the gist of the present invention. The various steps of the processing described in the embodiment is executed chronologically in the described order and may also be executed in parallel or individually as necessary or in accordance with a processing capability of the device that performs the processing.

Program and Recording Medium

When various processing functions in the devices described in the foregoing embodiment are realized by a computer, processing content of the functions of the devices are described in accordance with a program. When the program is executed by a computer, the various processing functions of the device are implemented on the computer.

The program in which the processing details are described can be recorded on a computer-readable recording medium. The computer-readable recording medium can be any type of medium such as a magnetic recording device, an optical disc, a magneto-optical recording medium, or a semiconductor memory.

The program is distributed, for example, by selling, giving, or lending a portable recording medium such as a DVD or a CD-ROM with the program recorded on it. Further, the program may be stored in a storage device of a server computer and the program is transmitted from the server computer to another computer via a network, so that the program is distributed.

For example, a computer executing the program first temporarily stores a program recorded on a portable recording medium or a program transmitted from a server computer in an own storage device. When processing is executed, the computer reads the program stored in the own storage device and executes the processing in accordance with the read program. As another execution form of the program, the computer may directly read a program from a portable recording medium and execute a program in accordance with the program. Further, the computer executes processing in order in accordance with the received program whenever a program is transmitted from a server computer to the computer. In another configuration, the processing may be executed through a so-called application service provider (ASP) service in which functions of the processing are implemented just by issuing an instruction to execute the program and obtaining results without transmission of the program from the server computer to the computer. The program in this form is assumed to include a program which is information provided for processing of a computer and is equivalent to a program (data or the like that has characteristics regulating processing of the computer rather than a direct instruction for a computer).

In this form, the keyword extraction device is configured by executing a predetermined program on a computer. However, at least a part of the processing content may be realized by hardware.

REFERENCE SIGNS LIST

1 Anomaly score learning apparatus
11 Input unit
12 Anomalous sound generation unit
13 Threshold value determination unit
14 Parameter update unit
15 Convergence determination unit
16 Output unit
2 Anomalous sound detection apparatus
20 Parameter storage
21 Input unit
22 Anomaly score obtaining unit
23 State determination unit
24 Output unit

What is claimed is:

1. An anomaly sound detection apparatus to determine a target industrial device is in a normal state or in an anomalous state by calculating an anomaly score of an input sound data, the anomaly sound detection apparatus comprising processing circuitry configured to:
   obtain an operational sound generated by the target industrial device;
   obtain an input sound data from the operational sound;
   calculate a first score from the first input sound data using an anomaly score function obtained by learning a plurality of normal sound samples;
   calculate a second score using similarity between registered anomalous sounds and the input sound data and dissimilarity between registered normal sounds and the input sounds data;
   calculate the sum of the first score and the second score as the anomaly score of the input sound data,
      wherein, when a new anomalous sound is obtained, the processing circuitry further calculates the anomaly score by adding a third score to the sum of the first score and the second score, and the third score is obtained using similarity between the new anomalous sound and the input sound data and dissimilarity between registered normal sounds and the input sound data, thereby improving update efficiency of unsupervised anomaly sound detection apparatus without re-learning the anomaly score function.

2. An anomaly sound detection apparatus to determine a target industrial device is in a normal state or in an anomalous state by calculating an anomaly score from an observed sound signal, comprising:
   an input circuitry that receives an operational sound generated by the target industrial device and obtains an observed sound signal from the operational sound;
   an anomaly score obtaining circuitry that calculates an anomaly score from input observed sound signal by an anomaly score calculation function that includes anomaly score function obtained by learning a plurality of normal sound samples and k similarity functions obtained by learning k anomalous sound samples, wherein the k represents a natural number, wherein the anomaly score calculation function is updated by:
   obtaining a new anomalous sound sample,
   generating a k+1th similarity function by learning the new anomalous sound samples and
   adding the k+1th similarity function to the k similarity functions, thereby improving update efficiency of unsupervised anomaly sound detection apparatus without re-learning the anomaly score function or the k similarity functions.

3. A non-transitory computer-readable recording medium on which a program for causing a computer to function as the anomaly score calculation apparatus according to claim 2 is recorded.

* * * * *